Sept. 4, 1956  F. B. ANTHON  2,761,732
GENERAL UTILITY GARDENING IMPLEMENT
Filed Jan. 24, 1955
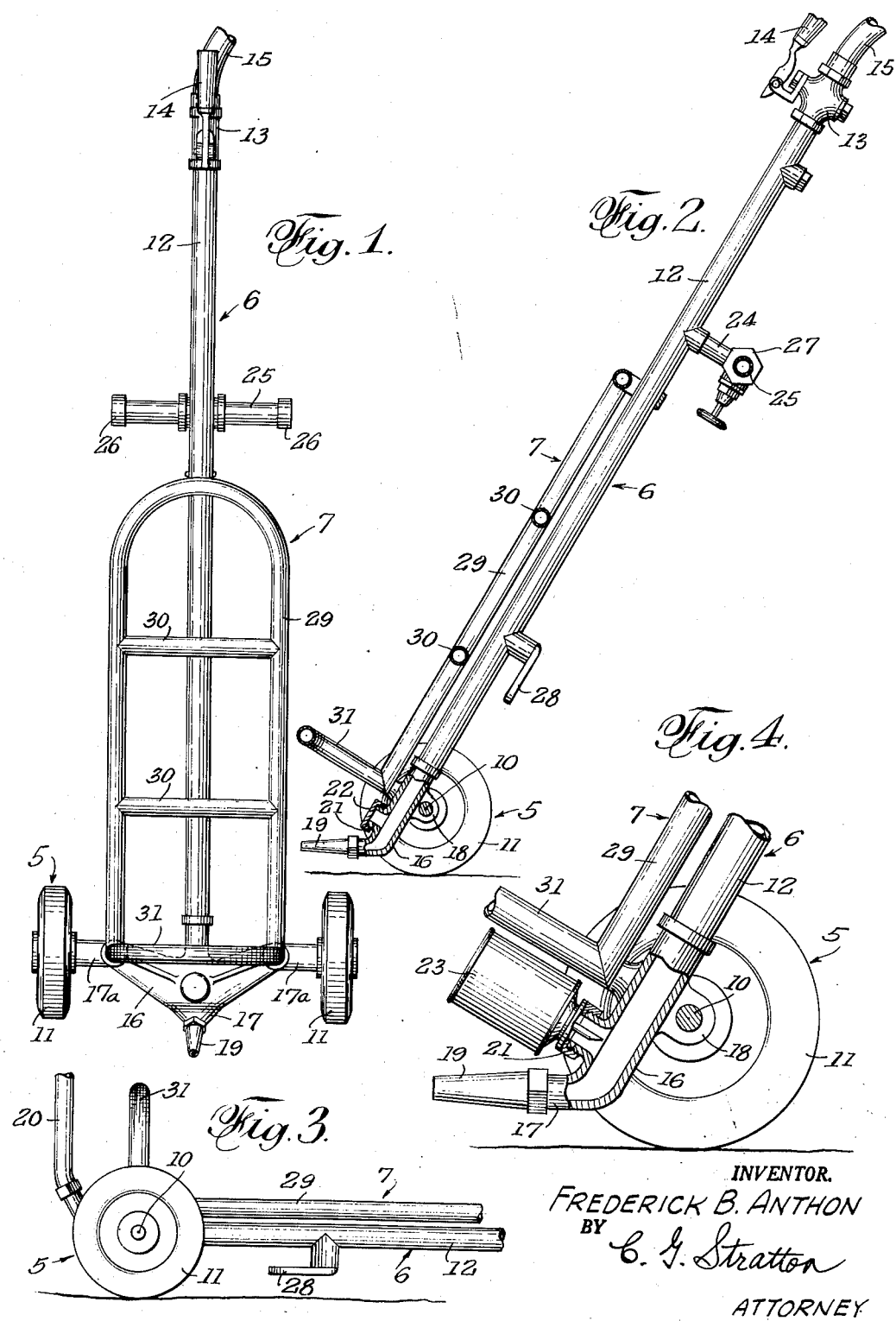
INVENTOR.
FREDERICK B. ANTHON
BY
C. G. Stratton
ATTORNEY

United States Patent Office 2,761,732
Patented Sept. 4, 1956

2,761,732

GENERAL UTILITY GARDENING IMPLEMENT

Frederick B. Anthon, Los Angeles, Calif.

Application January 24, 1955, Serial No. 483,543

3 Claims. (Cl. 299—47)

This invention relates to an implement or tool that has general utility in the garden and for other purposes, such as rug and carpet washing and shampooing. It is an object of the present invention to provide an implement that is efficient for such purposes.

Another object of the invention is to provide a device of the character referred to that is wheel-borne and readily maneuverable with one hand while the user remains erect, thus promoting comfort and convenience of use.

A further object of the invention is to provide a general utility implement that has manifold uses, among which are water sweeping of litter, irrigation, sprinkling and lawn watering, fertilizing, washing, generally, etc.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a front elevational view of a general utility watering implement embodying a preferred form of the present invention.

Fig. 2 is a longitudinal sectional view thereof in one of its operative positions.

Fig. 3 is a broken side elevational view in another operative position.

Fig. 4 is an enlarged fragmentary sectional view showing another use of the present implement.

The general utility implement that is illustrated comprises, generally, support and traction wheel means 5, a combined water-conducting and handle means 6 carried by the wheel means, and an article-carrying frame 7 affixed to the means 6 and cooperating therewith to increase the general utility of the present implement.

The wheel means 5 preferably comprises an axle 10 and two spaced wheels 11 freely rotational on said axle, the latter enabling complete maneuverability of the implement.

The combined water-conducting and handle means 6 comprises an elongated pipe or tube 12 that, at its upper end, is provided with a normally closed flow-controlling valve 13. The handle 14 of said valve is adapted to be pressed by the fingers of the hand, grasping the pipe 12, to control flow from a flexible hose 15 connected to said pipe. In the elongated form of pipe 12 that is shown, the same constitutes an efficient handle for manipulating the implement on its wheels 11.

At its lower end, the pipe 12 is connected to a housing 16 that terminates in a forwardly-directed end 17. Said housing is provided with cross arms 17a from which may extend ears 18 that constitute bearings for axle 10. Since the housing 16 resides in the space between wheels 11 and pipe 12 and is disposed centrally between said wheels, a symmetrical arrangement is achieved.

Said end 17 is adapted to receive or connect to various types of fittings. As shown in Figs. 1, 2 and 4, such a fitting may comprise a nozzle 19 of suitable length and which may serve to supply a high-speed jet of water that is directed horizontally or nearly so while the implement is held, as in the rearwardly angled or sloping position of Fig. 2. The effectiveness of the present device as a litter sweeper should be clear, particularly when it is understood that nozzle 19 can be directed, as desired, because of the maneuverability of the wheel means 5 by the elongated handle provided. Another type of fitting adapted to be connected to end 17 is shown in Fig. 3 and comprises a pipe 20 that may be either vertically disposed, as in said figure, or be directed at any forward or lateral angle, as desired, when the pipe 12 is in the horizontal position shown. The pipe 20 may be of any length or height and is adapted to mount a sprinkler head, shower head, etc. Said nozzle 19 and pipe 20 are but two of many different fittings that may be used on end 17.

As can be seen, housing 16 may be provided with a connection nipple 21 that may be fitted with a closure cap 22 when not needed, but may serve as means for mounting supply means auxiliary to the water flowing in pipe 12. As seen in Fig. 4, such means may comprise a container 23 for fertilizer, insecticide, soap, detergent, etc., the contents of which may be drawn into the flow in said housing. It will be understood that container 23 represents any auxiliary source of material and may be a hose extending from a container otherwise carried by the present device.

The pipe 12 may have a rearward extension 24 intermediate its length, and a crosspipe 25, provided with capped ends 26 may be connected to said extension and be controlled by a valve 27. Additional auxiliary connections may be made to ends 26, as desired, to introduce flow, from said latter connections, into pipe 12. Valve 27 may be used to control said flow.

The extension 24 and cross pipe 25 may comprise one end and a projection 28 on said pipe 12 may comprise the opposite end of the hose-holding means which may be used to neatly store hose 15 when not in use.

The frame 7 may be used to hold the mentioned auxiliary container that, by a hose, may be connected to nipple 21, or the same may be used for various transporting purposes incidental to the use of the implement for the different purposes intended. Said frame may be affixed to handle pipe 12 and is shown as comprising an outer tubular frame part 29 provided with cross tubes 30 and with a toe end or support 31, also tubular.

Said frame 7 can hold a large container not readily directly connectable to nipple 21 and thus, enhances the flexibility of use of the present implement.

The various uses of the present device are believed to be evident from the foregoing.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A garden implement comprising an elongated pipe constituting a handle and adapted to have a flow connection at the upper end thereof, a transverse housing connected to the lower end of said pipe and receiving flow from the latter, transversely spaced ears on said housing, an axle extending through said ears and provided with wheels on which the implement is adapted to be moved and the axle constituting an axis around which the pipe and housing are adapted to be rotated between a position in which the pipe is substantially parallel to the ground and a more upright position, a nozzle extending from the housing to form an obtuse angle with the pipe, and a fitting connection on the housing to mount means discharging material into the flow in the housing for admixture with said flow.

2. A garden implement according to claim 1: the housing being generally flat with the opposed walls thereof being substantially parallel to the pipe, the mentioned ears being provided on one of said walls and the connection on the other.

3. A garden implement comprising an elongated pipe constituting a handle and adapted to have a flow connection at the upper end thereof, a transverse housing connected to the lower end of said pipe and receiving flow from the same, a pair of wheels mounted at the ends of said housing, a forwardly directed nozzle having a single discharge and mounted on said housing between the wheels and directed to discharge flow from the housing horizontally, the nozzle being arranged to include an obtuse angle with the pipe, a container-connecting nipple on the housing adjacent the nozzle and within the included obtuse angle of the nozzle and the elongated pipe, and a container mounted on said nipple, the container being entirely closed except for a connection with said nipple, said container being arranged to have its discharge mix with the flow from the pipe in the housing.

References Cited in the file of this patent

UNITED STATES PATENTS

| | | |
|---|---|---|
| 1,103,786 | Lewis | July 14, 1914 |
| 1,724,702 | Flickinger | Aug. 13, 1929 |
| 2,558,590 | Smith | June 26, 1951 |
| 2,572,142 | Hartenbach | Oct. 23, 1951 |
| 2,692,163 | Geel | Oct. 19, 1954 |